United States Patent
Nakamura

(10) Patent No.: US 8,353,324 B2
(45) Date of Patent: Jan. 15, 2013

(54) PNEUMATIC TIRE

(75) Inventor: Norihiko Nakamura, Osaka (JP)

(73) Assignee: Toyo Tire Rubber Co., Ltd., Osaka (JP)

( * ) Notice: Subject to any disclaimer, the term of this patent is extended or adjusted under 35 U.S.C. 154(b) by 547 days.

(21) Appl. No.: 12/444,405

(22) PCT Filed: Oct. 11, 2006

(86) PCT No.: PCT/JP2006/320286
§ 371 (c)(1),
(2), (4) Date: Apr. 21, 2009

(87) PCT Pub. No.: WO2008/044288
PCT Pub. Date: Apr. 17, 2008

(65) Prior Publication Data
US 2010/0078102 A1    Apr. 1, 2010

(51) Int. Cl.
*B60C 19/08* (2006.01)
(52) U.S. Cl. .............. 152/152.1; 152/DIG. 2; 152/564
(58) Field of Classification Search ........... 152/152.1, 152/DIG. 2, 543, 525; 156/130.7
See application file for complete search history.

(56) References Cited

U.S. PATENT DOCUMENTS

| | | | |
|---|---|---|---|
| 5,714,022 A | 2/1998 | Nagao et al. | |
| 5,898,047 A * | 4/1999 | Howald et al. | 152/152.1 |
| 5,937,926 A * | 8/1999 | Powell | 152/152.1 |
| 5,942,069 A | 8/1999 | Gerresheim et al. | |
| 6,070,630 A * | 6/2000 | Pompei et al. | 152/152.1 |
| 6,302,173 B1 * | 10/2001 | Mizuno et al. | 152/152.1 |
| 6,376,593 B1 | 4/2002 | Sasaka et al. | |
| 6,619,354 B1 | 9/2003 | Kobayashi et al. | |
| 6,742,559 B2 | 6/2004 | Iwamura | |
| 2002/0009608 A1 | 1/2002 | Nishikawa et al. | |

(Continued)

FOREIGN PATENT DOCUMENTS
CN    1145862    3/1997
(Continued)

OTHER PUBLICATIONS
Chinese Office Action or Application No. 200780036274.4, dated Aug. 9, 2010, 9 pages.
(Continued)

*Primary Examiner* — Justin Fischer
*Assistant Examiner* — Philip N Schwartz
(74) *Attorney, Agent, or Firm* — Fish & Richardson P.C.

(57) ABSTRACT

A pneumatic tire that can be manufactured according to the conventional method without requiring special tire manufacturing steps and without needing addition of material members and production steps, and having excellent rolling resistance and wet properties, and having conductivity is to be provided. A pneumatic tire 10 comprises a carcass 14, a rim strip 19, and a wing 24 in which one edge thereof is contacted with the carcass 14 and the other edge thereof is exposed to the surface of a ground contact edge region of a tread part 13, wherein a carcass ply 14 contacting the rim strip 19 and the wing 24 has a conductive ply 14X and a nonconductive ply 14Y on the circumference of the tire, and the conductive ply 14X and the rim strip and the wing form a continuous conductive path comprising a conductive rubber material, only the conductive path is used as a conducting path of the tire, and members other than the conducting path are selected and used from a conductive rubber material or a nonconductive rubber material.

21 Claims, 8 Drawing Sheets

U.S. PATENT DOCUMENTS

| | | | |
|---|---|---|---|
| 2003/0196738 A1 | 10/2003 | Kobayashi et al. | |
| 2004/0069386 A1* | 4/2004 | Janajreh et al. | 152/152.1 |
| 2004/0173295 A1 | 9/2004 | Zanzig et al. | |
| 2005/0034801 A1 | 2/2005 | Matsunaga | |
| 2005/0103412 A1* | 5/2005 | Zanzig et al. | 152/152.1 |
| 2005/0211362 A1 | 9/2005 | Hirayama | |
| 2006/0021687 A1 | 2/2006 | Dheur et al. | |
| 2006/0102264 A1 | 5/2006 | Nicolas | |
| 2007/0000585 A1 | 1/2007 | Uchida et al. | |
| 2007/0163690 A1 | 7/2007 | Nobuchika et al. | |
| 2007/0215257 A1 | 9/2007 | Uchida et al. | |
| 2007/0227636 A1 | 10/2007 | Mizuno et al. | |
| 2009/0266456 A1 | 10/2009 | Nakamura | |
| 2009/0308512 A1 | 12/2009 | Nakamura | |
| 2010/0078103 A1 | 4/2010 | Nakamura | |

FOREIGN PATENT DOCUMENTS

| | | | |
|---|---|---|---|
| CN | 1891508 | | 1/2007 |
| CN | 1990284 | | 7/2007 |
| EP | 0 658 452 | | 6/1995 |
| EP | 0 853 010 | | 7/1998 |
| GB | 544757 | * | 4/1942 |
| JP | 61-015605 | | 1/1986 |
| JP | 61-015606 | | 1/1986 |
| JP | 08-216615 | | 8/1996 |
| JP | 08-230407 | | 9/1996 |
| JP | 09-030212 | | 2/1997 |
| JP | 09-071112 | | 3/1997 |
| JP | 11-217011 | | 8/1999 |
| JP | 11-254924 | | 9/1999 |
| JP | 2000-025425 | | 1/2000 |
| JP | 2000-025428 | | 1/2000 |
| JP | 2000-079805 | | 3/2000 |
| JP | 2000-190709 | | 7/2000 |
| JP | 2000-211323 | | 8/2000 |
| JP | 2000-318408 | | 11/2000 |
| JP | 2001-233994 | | 8/2001 |
| JP | 2002-120514 | | 4/2002 |
| JP | 2002-210843 | | 7/2002 |
| JP | 2003-211913 | | 7/2003 |
| JP | 2003-246888 | | 9/2003 |
| JP | 2003-312213 | | 11/2003 |
| JP | 2004-249537 | | 9/2004 |
| JP | 2005-225985 | | 8/2005 |
| JP | 2005-271857 | | 10/2005 |
| JP | 2006-111767 | | 4/2006 |

OTHER PUBLICATIONS

Chinese Office Action for Application No. 200780036274.4 dated Jun. 24, 2011.
Chinese Office Action for Application No. 200680056097.1 dated Oct. 12, 2010.
Notification of Reasons for Refusal for Application No. 2008-538527, dated May 10, 2011.
Office Action for U.S. Appl. No. 12/441,428 dated Oct. 7, 2011.
Office Action for U.S. Appl. No. 12/442,969 dated Oct. 12, 2011.
Office Action for U.S. Appl. No. 12/444,605 dated Jun. 10, 2011.
Chinese Office Action for Application No. 200680056097.1 dated Nov. 30, 2011 with English translation.
Final Office Action for U.S. Appl. No. 12/441,428 dated Mar. 29, 2012.
Office Action for U.S. Appl. No. 12/441,428 dated Aug. 1, 2012.
Office Action for U.S. Appl. No. 12/442,969 dated Apr. 12, 2012.
Final Office Action for U.S. Appl. No. 12/444,605 dated Apr. 13, 2012.
Chinese Office Action for Application No. 200680056097.1 dated Mar. 31, 2012 with English translation.

* cited by examiner

PNEUMATIC TIRE

TECHNICAL FIELD

The present invention relates to a pneumatic tire. More particularly, the invention relates to a pneumatic tire manufactured by the conventional process, that has a tread of silica compounding or the like, improves rolling resistance and wet properties of a tire, and can discharge static electricity charged in vehicles to road surface.

BACKGROUND ART

To improve rolling resistance and running performance (wet properties) on wet road surface of a pneumatic tire, the technology of compounding silica with a rubber composition of a tread as a reinforcing agent in place of the conventional carbon black is known. With this silica compounding technology, static electricity charged in vehicles gives rise to the problems that discharge phenomenon is generated when a tire passes on manholes and the like, resulting in radio noise, adverse influence to electronic circuit parts, generation of short-circuit, and the like.

Conventionally, to solve those problems, the technology of providing a conductive member having carbon black compounded therein in a part of a tread structure, thereby securing conductivity of a tire is proposed. For example, the technology of Patent Document 1 below describes that a conductive thin film containing carbon black is arranged on the outer surfaces of a tread and a side wall, thereby discharging through this conductive layer. Furthermore, the technology of Patent Document 2 discloses that a conductive insert is provided on a tire crown part over from a tread surface to a bottom, and a conductive strip comprising a conductive material being in contact with this insert is in a contact state with a wheel in a conductive bead region, thereby discharging static electricity.

Patent Document 1: JP-A-8-230407
Patent Document 2: JP-A-2006-143208

DISCLOSURE OF THE INVENTION

Problems that the Invention is to Solve

However, the technology of Patent Document 1 is that improvement effects on rolling resistance and wet properties of a tread by silica compounding are decreased by arranging the above-described conductive thin film containing carbon black, and it is difficult to sufficiently exhibit the original effect. Furthermore, from that the conductive thin film containing carbon black is arranged on the outer surfaces of a tread and a side wall, additional material members and process steps are required, and deterioration of productivity and increase in costs are predicted.

The technology of Patent Document 2 requires to separately providing conductive insert and strip. Therefore, the number of members is increased, and special process steps are required. Thus, it is difficult to say that such a tire has a structure that is easily produced, and decrease in productivity is predicted.

In view of the above problems, the object of the invention is to provide a pneumatic tire, that can be manufactured according to the conventional process without requiring special tire manufacturing steps and without needing addition of material members and process steps, has excellent rolling resistance and wet properties, and has conductivity.

Means for Solving the Problems

The invention described in claim 1 is a pneumatic tire comprising a carcass having at least one carcass ply which is turned back and locked around a bead core embedded in each of a pair of bead parts, a rim strip provided in the bead part and contacting with a rim and the carcass, and a wing in which one edge thereof is contacted with the carcass and the other edge thereof is exposed to the surface of a ground contact edge region of a tread part, characterized in that at least a carcass ply covering rubber at the contact face side to the rim strip and the wing has a conductive ply comprising a conductive rubber material and a nonconductive ply comprising a nonconductive rubber material on the circumference of the tire, and the conductive ply and at least the rim strip and the wing in either one side part form a continuous conductive path comprising a conductive rubber material, only the conductive path is used as a conducting path of the tire, and members other than the conducting path are selected and used from a conductive rubber material or a nonconductive rubber material.

The invention claimed in claim 2 is the pneumatic tire as claimed in claim 1, characterized in that the conductive ply occupies from 10 to 50% of the circumferential length of the tire over between a pair of the bead parts.

The invention claimed in claim 3 is the pneumatic tire as claimed in claim 1 or 2, characterized in that the carcass comprises at least one carcass ply which is turned back from the inside of the tire to the outside thereof around a pair of the bead cores and locked, both front and back faces of the carcass ply are covered with the conductive rubber, and the turned back portion of the carcass ply is contacted with the rim strip.

The invention claimed in claim 4 is the pneumatic tire as claimed in claim 1 or 2, characterized in that the carcass comprises at least one first carcass ply which is turned back from the inside of the tire to the outside thereof around a pair of the bead cores and locked, and a second carcass ply which reaches the bead part through a side wall part from the tread part, contacts with the rim strip, and is locked, and a second carcass ply covering rubber of a tire outside face of the second carcass ply comprises a conductive rubber material.

The invention claimed in claim 5 is the pneumatic tire as claimed in claim 1 or 2, characterized in that the carcass comprises at least one carcass ply which is turned back from the inside of the tire to the outside thereof around a pair of the bead cores and locked, and the carcass ply at the inner face side of the carcass is extended to the wing outward in a radial direction of the tire while contacting with the rim strip to contact with the wing, and is locked, in the turned back portion.

The invention claimed in claim 6 is the pneumatic tire as claimed in any one of claims 1 to 5, characterized in that the conductive rubber material is a rubber composition having electric resistivity less than $10^8$ Ω·cm.

The invention claimed in claim 7 is the pneumatic tire as claimed in claim 6, characterized in that the conductive rubber material comprises a rubber composition comprising a diene rubber as a rubber component, and carbon black having a nitrogen adsorption specific area of from 25 to 100 $m^2/g$ is contained in an amount of 14 vol % or more of the entire rubber composition.

The invention claimed in claim 8 is the pneumatic tire as claimed in claim 1, characterized in that the nonconductive rubber material comprises a rubber composition containing a non-carbon black reinforcing agent as a reinforcing agent.

The invention claimed in claim 9 is the pneumatic tire as claimed in claim 8, characterized in that the non-carbon black reinforcing agent is silica.

Advantage of the Invention

By forming a continuous conductive path on a part of the circumference of a tire by utilizing a conductive carcass ply, and using only the conductive path as a conducting path of the tire, the pneumatic tire of the present invention can provide a tire having conductivity while additionally having excellent rolling resistance and wet properties due to silica compounding, that can be manufactured by the conventional process without requiring any special tire manufacturing step as disclosed in the prior art, and without needing addition of material members and process steps, and can eliminate problems such as noises, adverse influence to electronic parts, and short-circuit, due to static electricity charged in vehicles using a nonconductive tire of silica compounding or the like.

BEST MODE FOR CARRYING OUT THE INVENTION

The embodiments of the present invention are described below.

First Embodiment

FIG. 1 is a semi-sectional view showing a pneumatic tire 10 of a first embodiment of the invention.

The pneumatic tire (hereinafter, the pneumatic tire is simply referred to as a "tire") 10 comprises a carcass 14 comprising one carcass ply 25 which is turned back from the inside of the tire to the outside thereof around a bead core 12 embedded in each of a pair of the bead parts 11, and locked, a tread part 13 located at an outer circumferential side in a radial direction of the tire of the carcass 14, a side wall part 16 located at the side part of the carcass 14, and a belt 18 comprising two crossed belt plies provided inward the tread part 13 and between the tread part 13 and the carcass 14.

The tire 10 has a rim strip 19 provided outward in an axial direction of the tire of the bead part 11, and the outside face of a rim strip rubber 23 is contacted with a rim, and the inside face thereof is contacted with a turned back portion 14a of the carcass ply 25.

The tire 10 has a side wall-on-tread (SWOT) structure in which the outward edge in a radial direction of the tire of the side wall part 16 is overlapped on both edges of a crown part 15 constituting a main ground contact part in the tread part 13, as shown in FIG. 1. Specifically, the outward edge of the side wall part 16 covers the surface of both peripheral parts of the tread part 13 on the circumference of the tire to form a shoulder part 17 constituting a tread ground contact edge region.

In the shoulder part 17, a wing 24 in which an upper edge thereof is exposed to the surface of the tread ground contact edge region and contacted with road surface, and the lower edge thereof is contacted with the carcass ply 25 is provided between both edges of a tread rubber 21 and the outward edge in a radial direction of the tire of a side wall rubber 22.

Therefore, the carcass ply 25 turns back around the bead core 12 through the side wall part 16 while contacting with the lower edge of the wing rubber 24 over from the tread part 13 to the shoulder part 16, and is contacted with the tire inner face side of the rim strip rubber 23, and a ply turned back edge 14a is locked in the side wall part 16. By this, the rim strip 19 and the wing 24 are continuously connected through a carcass ply 14.

Furthermore, the tire 10 shows a tire for passenger car having a radial structure having a belt 18 comprising two crossed belt plies provided inside the tread part 13, and one cap ply 20 comprising a cord helically wound at an angle of nearly 0° to a circumferential direction of the tire, on the outer circumference of the belt 18.

An organic fiber cord such as polyester, nylon or rayon is used in the carcass ply 25 as a reinforcing material, a rigid cord such as steel cord or aramide fiber is used in a belt ply of the belt 18 as a reinforcing material, and a cord having relatively large heat shrinkability such as nylon or polyester is used in a cap ply 20 as a reinforcing material.

A rubber composition using non-carbon black reinforcing agents such as silicas such as precipitated silica or silicic anhydride, clays such as calcined clay or hard clay, and calcium carbonate as a reinforcing agent in place of the conventional carbon black as a reinforcing agent is used in a tread rubber 21 constituting the crown part 15 corresponding to a main ground contact part of the tread part 13 so as to decrease tan δ of a rubber composition in order to contribute to the improvement of rolling resistance and wet properties of the tire 10. Silica having large improvement effect on rolling resistance and the like is particularly preferably used.

In those non-carbon black rubber compositions, the compounding amount of the non-carbon black reinforcing agent such as silica is generally from 30 to 100 parts by weight, and preferably from 40 to 80 parts by weight, per 100 parts by weight of the rubber component, although varying depending on the kind and the substitution amount of carbon black.

In the case of silica, the kind of silica is not particularly limited. Wet silica having nitrogen adsorption specific area (BET) of from 100 to 250 $m^2$/g and DBP oil absorption of 100 ml/100 g or more is preferred in reinforcing effect and processability, and the commercially available products such as NIPSIL AQ and VN3, manufactured by Tosoh Silica Corporation, and ULTRASIL VN3, manufactured by Degussa can be used. Furthermore, the combination use of a silane coupling agent such as bis(triethoxysilylpropyl)-tetrasulfide is preferred.

As carbon black in the tread rubber 21, SAF, ISAF, HAF and the like are preferred in abrasion resistance and exothermic properties.

Diene rubbers such as natural rubber (NR), isoprene rubber (IR), styrene-butadiene rubber (SBR) and butadiene rubber (BR) are generally used as a rubber component in the rubber composition of the tread rubber 21. Those are used alone or as a blend rubber. Furthermore, oils of rubber compounding agent, softeners such as wax, stearic acid, zinc white, resins, age resistors, vulcanizing agents such as sulfur, vulcanization accelerators, and the like are appropriately compounded.

Furthermore, to enhance the improvement effects such as rolling resistance, a rubber composition containing the non-carbon black reinforcing agent as a reinforcing agent in an amount of from 30 to 100 parts by weight per 100 parts by weight of the rubber component is used in a side wall rubber 22 of the side wall part 16, simultaneously with the tread rubber.

The nonconductive side wall 22 is obtained by containing diene rubbers such as NR, IR, SBR, BR or butadiene rubber (VCR) containing syndiotactic-1,2-polybutadiene, alone or as blends thereof, as a rubber component, and carbon black having nitrogen adsorption specific surface area ($N_2SA$) of from 25 to 100 $m^2$/g in an amount less than 14 vol % of the entire rubber composition.

Furthermore, where $N_2SA$ of carbon black is less than 25 $m^2$/g, durability is decreased due to decrease in strength of the rubber composition, and where $N_2SA$ exceeds 100 $m^2$/g, hysteresis loss is increased, resulting in increase in rolling resistance and generation of heat.

Carbon black having $N_2SA$ of from 25 to 100 $m^2/g$ includes carbon blacks of HAF, FEF and GPF grades.

Non-carbon black reinforcing agent such as silica, clay or calcium carbonate may be used in an appropriate amount in combination with carbon black. Furthermore, oils of rubber compounding agent, softeners such as wax, stearic acid, zinc white, resins, age resistors, vulcanizing agents such as sulfur, vulcanization accelerators, and the like are appropriately compounded.

By this, the tread rubber 21 and the side wall rubber 22 improve rolling resistance and wet properties, but on the other hand, the rubber compositions have electric resistivity of $10^8$ $\Omega \cdot cm$ or more, and form nonconductive rubbers. As a result, the tire 10 becomes nonconductive, and becomes a nonconductive tire having electric resistance of $10^9 \Omega$ or more by the combination of each member, and static electricity charged in vehicles cannot be discharged to road surface from the tread part 13.

To solve the problem on static electricity charged in vehicles, the tire 10 of the present embodiment is formed such that a conductive rubber or a nonconductive rubber is applied to at least a covering rubber (topping rubber) of the carcass ply 25 at a contact face side to the rim strip 19 and the wing 24, the topping rubber has a conductive ply 14X comprising a conductive rubber and a nonconductive ply 14Y comprising a nonconductive rubber on the circumference of the tire between the bead parts 11, 11, and a conductive rubber having electric resistivity less than $10^8$ $\Omega \cdot cm$ is applied to the rim strip rubber 23 and the wing rubber 24 in at least either one side part.

The tire 10 of the present embodiment is that as shown in a tire side view of FIG. 2 in which the side wall rubber 22 was cut off, a conducting path reaching the wing rubber 24 through the rim strip rubber 23 and the topping rubber of the conductive ply 14X from the rim is formed by providing the conductive ply 14X on a part of the circumference of the tire, and static electricity of vehicles can be discharged to road surface from the upper edge of the wing rubber 24 exposed to the surface of the shoulder part 17 and contacted with the road surface.

The conductive ply 14X may be arranged on one place of 14X1 on the circumference of the tire, and may be dividedly arranged on two places of 14X1 and 14X2, or more than two places. However, where the number of division is increased, the number of fabricating steps of a green tire is increased, resulting in decrease in productivity.

Furthermore, it is preferred that the proportion of the conductive ply 14X occupied in the carcass ply 25 is from 10 to 50% of the circumferential length of the tire over between beads 11, 11. That is, the ply formed between beads 11, 11 is changed to the conductive ply 14X in a proportion of from 10 to 50% of carcass area of the tire inner face, and in a circumferential length of from 10 to 50% of the circumferential length of the tire. Where the proportion of the conductive ply is less than 10%, conductivity of the tire is deficient, resulting in decrease in discharge properties of static electricity. Where the proportion exceeds 50%, the amount of the conductive rubber used is increased, affecting the improvement of rolling resistance.

By this, the topping rubber of the conductive ply 14X and the wing rubber 24 are formed into a continuous conductive path from the rim strip rubber 23.

The tire 10 uses only the conductive path as a conducting path, and static electricity charged in vehicles can be discharged to road surface from the upper edge of the wing rubber 24 exposed to the surface of the shoulder 17 and contacting with the road surface through the rim strip rubber 23 and the topping rubber of the carcass ply 25 from the rim.

A method for applying the conductive ply 14X to the tire is not particularly limited, but a method of jointing the nonconductive ply 14Y and the conductive ply 14X on a molding drum at the time of fabricating a green tire, and forming the carcass ply 25 is simple and easy. Furthermore, the carcass ply 25 may be produced by cutting a topping sheet and alternately jointing the conductive ply 14X and the nonconductive ply 14Y in a given width in a jointing process.

The conductive rubber composition can easily be obtained by appropriately adjusting the compounding amount of carbon black, and it is desired that the rubber composition has electric resistivity preferably less than $10^7$ $\Omega \cdot cm$.

The conductive topping rubber is obtained by containing diene rubbers such as NR, IR, SBR, BR or butadiene rubber (VCR) containing syndiotactic-1,2-polybutadiene, alone or as blends thereof, as a rubber component, and carbon black having nitrogen adsorption specific surface area ($N_2SA$) of from 25 to 100 $m^2/g$ in an amount of 14 vol % or more of the entire rubber composition.

Where the amount of carbon black is less than 14 vol %, electric resistivity of the rubber composition is $10^8$ $\Omega \cdot cm$ or more, resulting in deterioration of conductivity. Furthermore, where $N_2SA$ of carbon black is less than 25 $m^2/g$, durability is decreased due to decrease in strength of the rubber composition, and where $N_2SA$ exceeds 100 $m^2/g$, hysteresis loss is increased, resulting in increase in rolling resistance and generation of heat.

Carbon black having $N_2SA$ of from 25 to 100 $m^2/g$ includes carbon blacks of HAF, FEF and GPF grades.

Non-carbon black reinforcing agent such as silica, clay or calcium carbonate may be used in an appropriate amount in combination with carbon black. Furthermore, oils of rubber compounding agent, softeners such as wax, stearic acid, zinc white, resins, age resistors, vulcanizing agents such as sulfur, vulcanization accelerators, and the like are appropriately compounded.

In the present embodiment, by contacting the tire outer face side of the conductive ply 14X with the lower edge of the wing rubber 24 and contacting the tire inner face side of the ply 14X with the inner face side of the rim strip rubber 23 after turning back the bead core 12, electricity is passed through the topping rubber of the conductive ply 14X. Therefore, it is necessary to apply a conductive rubber to the topping rubbers of both the front and back faces of the ply 14X.

The carcass ply 25 is obtained by subjecting both sides of an adhesive-treated tire cord fabric obtained by weaving an organic fiber cord with given counts to topping processing using a conductive rubber or a nonconductive rubber in a given rubber thickness using a calender apparatus for fiber cord generally used in tire industries, having Z type calender or two tandem-arranged three-roll calenders by the conventional method. The carcass ply can similarly be obtained in the following embodiments.

The conductive rim strip rubber 23 contains diene rubbers such as NR, IR, SBR, BR or VCR alone or as blends thereof, as a rubber component, and carbon black having $N_2SA$ of from 70 to 100 $m^2/g$ in an amount of 14 vol % or more of the entire rubber composition.

Where the amount of carbon black is less than 14 vol %, electric resistivity of the rubber composition is $10^8$ $\Omega \cdot cm$ or more, resulting in deterioration of conductivity. Furthermore, where $N_2SA$ of carbon black is less than 70 $m^2/g$, the bead part is liable to be damaged due to rim rubbing by decrease in abrasion resistance of the rubber composition, and where $N_2SA$ exceeds 100 m$^2$/g, hysteresis loss deteriorates, resulting in increase in rolling resistance and generation of heat.

Carbon black having $N_2SA$ of from 70 to 100 m$^2$/g includes carbon black of HAF grade.

Non-carbon black reinforcing agent such as silica, clay or calcium carbonate may be used in an appropriate amount in combination with carbon black. Furthermore, oils of rubber compounding agent, softeners such as wax, stearic acid, zinc white, resins, age resistors, vulcanizing agents such as sulfur, vulcanization accelerators, and the like are appropriately compounded.

The conductive wing rubber 24 comprises a rubber composition containing diene rubbers such as NR, IR, SBR, BR or VCR alone or as blends thereof, as a rubber component, and carbon black having $N_2SA$ of from 25 to 100 m$^2$/g in an amount of 14 vol % or more of the entire rubber composition.

Where the amount of carbon black is less than 14 vol %, electric resistivity of the rubber composition is $10^8$ Ω·cm or more, resulting in deterioration of conductivity. Furthermore, where $N_2SA$ of carbon black is less than 25 m$^2$/g, durability is decreased due to decrease in strength of the rubber composition, and where $N_2SA$ exceeds 100 m$^2$/g, hysteresis loss deteriorates, resulting in increase in rolling resistance and generation of heat.

Carbon black having $N_2SA$ of from 25 to 100 m$^2$/g includes carbon blacks of HAF, FEF and GPF grades.

Non-carbon black reinforcing agent such as silica, clay or calcium carbonate may be used in an appropriate amount in combination with carbon black. Furthermore, oils of rubber compounding agent, softeners such as wax, stearic acid, zinc white, resins, age resistors, vulcanizing agents such as sulfur, vulcanization accelerators, and the like are appropriately compounded.

In the present embodiment, the conductive ply 14X interconnecting the right and left bead parts 11, 11 is used as a conducting path. Therefore, it is sufficient only if the conductive rim strip 19 and wing 24 are provided on at least either one tire side part, and the arrangement is not particularly limited. That is, when the conductive rim strip 19 and wing 24 are provided on every either one tire side part, discharge properties of static electricity using the carcass ply 25 as a conducting path can be secured.

The arrangement examples of the conductive rim strip 19 and wing 24 are specifically described below. (1) The conductive rim strip and wing are arranged at both side parts of the tire. (2) The conductive rim strip and wing are arranged at only one side part, and nonconductive rim strip and wing are applied to other side part. (3) A conductive rim strip and a nonconductive wing are arranged at one side part, and a nonconductive rim strip and a conductive wing are applied to other side part. Alternatively, the reverse arrangement is employed.

That is, the case (1) that a conductive rubber is applied to the rim strip rubber 23 and the wing rubber 24 at both side parts of the tire 10 is preferred in the standpoint that conductivity of a tire is increased. Although electric resistance of a tire is slightly increased by the arrangements (2) and (3) above, conductivity of a tire can be secured and there is no practical problem. By this, rolling resistance and wet properties of the tire 10 can be improved by increasing the amount of the nonconductive rubber used.

The nonconductive rim strip rubber 23 is obtained by changing only the compounding amount of carbon black in the conductive rubber. That is, the nonconductive rim strip rubber 23 is a rubber composition containing carbon black having $N_2SA$ of from 70 to 100 m$^2$/g in an amount less than 14 vol % of the entire rubber composition. Where the amount of carbon black is 14 vol % or more, electric resistivity of the rubber composition is less than $10^8$ Ω·cm, and the rubber composition has conductivity. However, improvement in rolling resistance is not obtained.

The nonconductive wing rubber 24 is obtained by changing only the compounding amount of carbon black in the conductive wing rubber. That is, the nonconductive wing rubber 24 is a rubber composition containing carbon black having $N_2SA$ of from 25 to 100 m$^2$/g in an amount less than 14 vol % of the entire rubber composition. Where the amount of carbon black is 14 vol % or more, electric resistivity of the rubber composition is less than $10^8$ Ω·cm, and the rubber composition has conductivity. However, improvement in rolling resistance is not sufficiently obtained.

In the tire 10 shown in FIG. 1, the tread rubber 21 shows a tread of integrated structure. In the case that the tread part 13 has a cap/base structure, a nonconductive rubber is applied to a cap rubber from the standpoints of rolling resistance and wet properties. A base rubber can appropriately be selected from a conductive or nonconductive rubber. Other sites such as a topping rubber of a belt and bead filler can appropriately be selected from a conductive or nonconductive rubber so long as a conducting path is not formed. A nonconductive rubber is preferably selected from the standpoint of the improvement in rolling resistance and wet properties.

The above embodiment is described on the basis of a one ply structure tire comprising one carcass ply. However, needless to say, the present invention can be applied to a tire of a structure of two plies or more in which two or more carcass plies are turned back from the inside of the tire to the outside thereof around a bead core and locked. In this case, a conductive ply is applied to a ply at an outer face side of a tire.

Second Embodiment

FIG. 3 is a semi-sectional view showing a pneumatic tire 30 of a second embodiment according to the invention.

The tire 30 comprises two plies carcass 34 comprising two carcass plies 45, 46, a tread part 33 located at the outer circumferential part in a radial direction 5 of the tire of the carcass 34, a side wall part 36 located at the side part of the carcass 34, and a belt 38 comprising two crossed belt plies provided inward the tread part 33 and between the tread part 33 and the carcass 34.

The tire 30 is that a rim strip 39 is arranged at the outside in an axial direction of the tire of a bead part 31, an outside face of a rim strip rubber 43 is contacted with a rim, and the inside face thereof is contacted with the carcass 34.

The tire 30 has a SWOT structure in which the outside edge in a radial direction of the tire of the side wall part 36 is overlapped on both edges of a crown part 35 constituting a main ground contact part in the tread part 33. That is, the outside edge of the side wall part 36 covers the surface of both circumferential parts of the tread part 33 on the circumference of the tire, thereby forming a shoulder part 37 becoming a tread ground contact edge region.

In the shoulder part 37, a wing 44 in which the upper edge thereof is exposed to the surface of the tread ground contact edge region and contacted with road surface and the lower edge thereof is contacted with the carcass 34 is arranged between both edges of a tread rubber 41 and the outside edge in a radial direction of the tire of the side wall rubber 42.

The carcass 34 constitutes a two-ply tire comprising a first ply comprising one carcass ply 45 which is turned back from the inside of the tire to the outside thereof around a bead core 32 embedded in each of a pair of beads part 31, 31, and locked, and a second ply which reaches a rim strip 39 of the bead part 31 through a side wall part 36 from the tread part 33 and is contacted with the inner face side of a rim strip rubber 43, its ply edge 46*a* being locked in the bead part 31.

As shown in FIG. 3, the tire 30 of the present embodiment is such that the tire outside face of the second ply 46 is contacted with the lower edge of the wing rubber 44 and the inner face side of the rim strip rubber 43 between the tread part 33 and the bead part 31. By this, the rim strip 39 and the wing 44 are continuously connected through the second carcass ply 46.

Furthermore, the tire 30 shows a tire for passenger car having a radial structure having a belt 38 comprising two crossed belt plies provided inside the tread part 33, and one cap ply 40 comprising a cord helically wound at an angle of nearly 0° to a circumferential direction of the tire, on the outer circumference of the belt 38.

An organic fiber cord such as polyester, nylon or rayon is used in the carcass plies 45, 46 as a reinforcing material, a rigid cord such as steel cord or aramide fiber is used in a belt ply of the belt 38 as a reinforcing material, and a cord having relatively large heat shrinkability such as nylon or polyester is used in a cap ply 40 as a reinforcing material.

In the tire 30, similarly to the tire 10 of the first embodiment, a rubber composition using non-carbon black reinforcing agents such as silicas such as precipitated silica or silicic anhydride, clays such as calcined clay or hard clay, and calcium carbonate as a reinforcing agent in place of the conventional carbon black as a reinforcing agent is used in a tread rubber 41 of the tread part 33 so as to decrease tan δ of a rubber composition in order to contribute to the improvement in rolling resistance and wet properties of the tire 30. Silica having large improvement effect on rolling resistance and the like is particularly preferably used.

The rubber composition of the tread rubber 41 uses a composition containing a non-carbon black reinforcing material such as silica in an amount of generally from 30 to 100 parts by weight, and preferably from 40 to 80 parts by weight, per 100 parts by weight of the rubber component, although varying depending on the kind and substitution amount of carbon black.

Furthermore, to enhance the improvement effects on rolling resistance and the like, a rubber composition containing the non-carbon black reinforcing material as a reinforcing material in an amount of from 30 to 100 parts by weight per 100 parts by weight of the rubber component is used in the side wall rubber 42 of the side wall part 36.

Those nonconductive tread rubber 41 and side wall rubber 42 can use the rubber composition described in the first embodiment. Therefore, the description regarding formulation contents such as its rubber component and the amount of carbon black is omitted in the present embodiment.

By this, the tread rubber 41 and the side wall rubber 42 improve rolling resistance and wet properties, but on the other hand, the rubber compositions have electric conductivity of $10^8 \Omega \cdot cm$ or more, and form nonconductive rubbers. As a result, the tire 30 is nonconductive, and becomes a nonconductive tire having electric resistance of $10^9 \Omega$ or more by the combination of each member, and static electricity charged in vehicles cannot be discharged to road surface from the tread part 33.

To solve the problem on static electricity charged in vehicles, the tire 30 of the present embodiment is formed by that a conductive rubber or a nonconductive rubber is applied to at least the topping rubber of the tire outside face of the second ply 46 contacting with the rim strip 39 and the wing 44, the topping rubber has a conductive ply 46X comprising a conductive rubber and a nonconductive ply 46Y comprising a nonconductive rubber on the circumference of the tire between the bead parts 31, 31, and a conductive rubber having electric conductivity less than $10^8 \Omega \cdot cm$ is applied to the rim strip rubber 23 and the wing rubber 24 in at least either one side part.

The tire 30 of the present embodiment is such that as shown in a tire side view of FIG. 4 in which the side wall rubber 42 was cut off, a conducting path reaching the wing rubber 44 through the rim strip rubber 43 and the topping rubber of the conductive ply 46X from the rim is formed by providing the conductive ply 46X on a part of the circumference of the tire, and static electricity of vehicles can be discharged to road surface from the upper edge of the wing rubber 44 exposed to the surface of the shoulder part 17 and contacting with the road surface.

The conductive ply 46X may be arranged on one place of 46X1 on the circumference of the tire, and may be dividedly arranged on two places of 46X1 and 46X2, or more than two places. However, where the number of division is increased, the number of fabricating steps of a green tire is increased, resulting in decrease in productivity.

Furthermore, it is preferred that the proportion of the conductive ply 46X occupied in the second ply 46 is from 10 to 50% of the circumferential length of the tire over between beads 31, 31. That is, the second ply 46 formed between beads 31, 31 is changed to the conductive ply 46X in a proportion of from 10 to 50% of carcass area of the tire inner face, and in a circumferential length of from 10 to 50% of the circumferential length of the tire. Where the proportion of the conductive ply is less than 10%, conductivity of the tire is deficient, resulting in decrease in discharge properties of static electricity. Where the proportion exceeds 50%, the amount of the conductive rubber used is increased, affecting the improvement in rolling resistance.

By this, the rim strip rubber 43, the topping rubber of the conductive ply 46X of the second ply 46 and the wing rubber 44 are formed into a continuous conductive path.

The tire 30 uses only the conductive path as a conducting path, and static electricity charged in vehicles can be discharged to road surface from the upper edge of the wing rubber 44 exposed to the surface of the shoulder 17 and contacting with the road surface through the rim strip rubber 43 and the topping rubber of the conductive ply 46X of the second ply 46 from the rim.

A conducting path reaching the wing rubber 44 is formed, and static electricity charged in vehicles can be discharged to road surface from the upper edge of the wing rubber 44 exposed to the surface of the shoulder 37 and contacted with the road surface.

A method for applying the conductive ply 46X to the tire is not particularly limited, but a method of jointing the nonconductive ply 46Y and the conductive ply 46X on a molding drum at the time of fabricating a green tire, and forming the second ply 46 is simple and easy. Furthermore, the second ply 46 may be produced by cutting the topping sheet and alternately jointing the conductive ply 46X and the nonconductive ply 46Y in a given width in a jointing process.

The conductive rubber composition can easily be obtained by appropriately adjusting the compounding amount of carbon black, and it is desired that the rubber composition has electric resistivity of preferably less than $10^7 \Omega \cdot cm$.

The conductive topping rubber can use the rubber composition for topping rubber described in the first embodiment. Therefore, the description regarding formulation contents such as its rubber component and the amount of carbon black are omitted in the present embodiment.

In the present embodiment, the tire outer face side of the second ply 46 is contacted with the rim strip rubber 43 and the lower edge of the wing rubber 44 to form a conducting path. Therefore, a nonconductive rubber may be used in the tire inner face side of the second ply 46 and the first ply 45.

Even in the present embodiment, the second ply 46 contacting with the inner face side of the right and left rim strips 43 to interconnect the bead parts 31 is used as a conducting path. Therefore, it is sufficient only if the conductive rim strip 39 and wing 44 are provided in at least either one tire side part, and the arrangement is not particularly limited. That is, when the conductive rim strip 39 and wing 44 are provided in every either one tire side part, discharge properties of static electricity using the second ply 46 as a conducting path can be secured.

The conductive and nonconductive rubber rubbers used in the rim strip rubber 43 and the wing rubber 44 can use the rubber composition described in the first embodiment. Therefore, the description regarding formulation contents such as its rubber component and the amount of carbon black is omitted in the present embodiment.

In the tire 30 shown in FIG. 3, the tread rubber 41 shows a tread of integrated structure. In the case that the tread part 33 has a cap/base structure, a nonconductive rubber is applied to a cap rubber from the standpoints of rolling resistance and wet properties. A base rubber can appropriately be selected from a conductive or nonconductive rubber. Other sites such as a side wall, a topping rubber of a belt and bead filler can appropriately be selected from a conductive or nonconductive rubber so long as a conducting path is not formed. A nonconductive rubber is preferably selected from the standpoint of the improvement in rolling resistance and wet properties.

In the above description, the invention is described by the tire having two-ply structure in which one carcass ply 45 is turned back from the inside of the tire to the outside thereof around the bead core and locked. However, the invention can be applied to the tires having a structure of three or more plies, comprising a first carcass (inner ply) in which two or more carcass plies are turned back from the inside of the tire to the outside thereof around the bead core and locked, and a second carcass (outer ply) reaching the bead part 39 through the side wall part 36 from the tread part 33.

Third Embodiment

FIG. 5 is a semi-sectional view showing a pneumatic tire 30 of a third embodiment.

The tire 50 is equipped with two-ply carcass 54 comprising two carcass plies 65, 66, a tread part 53 located at the outer circumferential side in a radial direction of the tire of the carcass 54, a side wall part 56 located at the side part of the carcass 54, and a belt 58 comprising two crossed belt plies provided inside the tread part 53 and between the tread part 53 and the carcass 54.

The tire 50 is such that a rim strip 59 is arranged outside in an axial direction of the tire of the bead part 51, an outside face of a rim strip rubber 63 is contacted with a rim, and the inside face thereof is contacted with the carcass 54.

The tire 50 has a SWOT structure in which the outside edge in a radial direction of the tire of the side wall part 56 is overlapped on both edges of a crown part 55 constituting a main ground contact part in the tread part 53. That is, the outside edge of the side wall part 56 covers the surface of both circumferential parts of the tread part 53 on the circumference of the tire, thereby forming the shoulder part 57 becoming a tread ground contact edge region.

In the shoulder part 57, a wing 64 in which the upper edge thereof is exposed to the surface of the tread ground contact edge region and contacted with road surface and the lower edge thereof is contacted with the carcass 64 is arranged between both edges of the tread rubber 61 and the outside edge in a radial direction of the tire of the side wall rubber 62.

The carcass 54 comprises two carcass plies of a first ply 65 and a second ply 66 which are turned back from the inside of the tire to the outside thereof around a bead core 52 embedded in each of a pair of bead parts 51, 51, and locked. The second ply 66 is turned back around the bead core 52, and its ply edge 66a is locked in the bead part 51. The first ply 65 is turned back around the bead core 52 to contact with the rim strip 59, and is extended outward in a radial direction of the tire in the side wall part 56 to reach the shoulder part 57, and a ply edge 65a is contacted with a wing 64 and locked. Therefore, the tire 50 constitutes a two-ply tire forming the carcass 54 of substantially three-ply structure in the side wall 56.

The tire 50 of the present embodiment is that as shown in FIG. 5, the tire outside face of the first carcass ply 65 is contacted with the inner face side of the rim strip rubber 63 and the lower edge of the wing rubber 64 between the bead part 31 and the shoulder part 57 after turning back the bead core 52. By this, the rim strip 59 and the wing 64 are continuously connected through the first ply 65.

Furthermore, the tire 50 shows a tire for passenger car having a radial structure having a belt 58 comprising two crossed belt plies provided inside the tread part 53, and one cap ply 60 comprising a cord helically wound at an angle of nearly 0° to a circumferential direction of the tire, on the outer circumference of the belt 58.

An organic fiber cord such as polyester, nylon or rayon is used in the carcass plies 65, 66 as a reinforcing material, a rigid cord such as steel cord or aramide fiber is used in a belt ply of the belt 58 as a reinforcing material, and a cord having relatively large heat shrinkability such as nylon or polyester is used in a cap ply 60 as a reinforcing material.

In the tire 50, similarly to the tire 10 of the first embodiment, a rubber composition using non-carbon black reinforcing agents such as silicas such as precipitated silica or silicic anhydride, clays such as calcined clay or hard clay, and calcium carbonate as a reinforcing agent in place of the conventional carbon black as a reinforcing agent is used in a tread rubber 61 of the tread part 53 so as to decrease tan δ of a rubber composition in order to contribute to the improvement of rolling resistance and wet properties of the tire 50. Silica having large improvement effect in rolling resistance and the like is particularly preferably used.

The rubber composition of the tread rubber 61 uses a composition containing a non-carbon black reinforcing material such as silica in an amount of generally from 30 to 100 parts by weight, and preferably from 40 to 80 parts by weight, per 100 parts by weight of the rubber component, although varying depending on the kind and substitution amount of carbon black.

Furthermore, to enhance the improvement effects in rolling resistance and the like, a rubber composition containing the non-carbon black reinforcing material as a reinforcing material in an amount of from 30 to 100 parts by weight per 100 parts by weight of the rubber component is used in the side wall rubber 62 of the side wall part 56.

By this, the tread rubber 61 and the side wall rubber 62 improve rolling resistance and wet properties, but on the other hand, the rubber compositions have electric conductivity of $10^8$ Ω·cm or more, and form nonconductive rubbers. As a result, the tire 50 is nonconductive, and becomes a nonconductive tire having electric resistance of $10^9$Ω or more by the combination of each member, and static electricity charged in vehicles cannot be discharged to road surface from the tread part 53.

The nonconductive tread rubber 61 and side wall rubber 62 can use the rubber composition described in the first embodiment. Therefore, the description regarding formulation contents such as its rubber component and the amount of carbon black is omitted in the present embodiment.

To solve the problem on static electricity charged in vehicles, the tire 50 of the present embodiment is formed such that a conductive rubber or a nonconductive rubber is applied to at least the topping rubber of the tire outside face of the first ply 65 contacting with the rim strip 59 and the wing 64, the topping rubber has a conductive ply 65X comprising a conductive rubber and a nonconductive ply 65Y comprising a nonconductive rubber on the circumference of the tire between the bead parts 51, 51, and a conductive rubber having electric conductivity less than $10^8$ Ω·cm is applied to the rim strip rubber 63 and the wing rubber 64 in at least either one side part.

The tire 50 of the present embodiment is such that as shown in a tire side view of FIG. 6 in which the side wall rubber 62 was cut off, a conducting path reaching the wing rubber 64 through the rim strip rubber 63 and the topping rubber of the conductive ply 65X from the rim is formed by providing the conductive ply 65X on a part of the circumference of the tire, and static electricity of vehicles can be discharged to road surface from the upper edge of the wing rubber 64 exposed to the surface of the shoulder part 57 and contacting with the road surface.

The conductive ply 65X may be arranged on one place of 65X1 on the circumference of the tire, and may be dividedly arranged on two places of 65X1 and 65X2, or more than two places. However, where the number of division is increased, the number of fabricating steps of a green tire is increased, resulting in decrease in productivity.

Furthermore, it is preferred that the proportion of the conductive ply 65X occupied in the first ply 65 is from 10 to 50% of the circumferential length of the tire over between beads 51, 51. That is, the first ply 65 formed between beads 51, 51 is changed to the conductive ply 65X in a proportion of from 10 to 50% of carcass area of the tire inner face, and in a circumferential length of from 10 to 50% of the circumferential length of the tire. Where the proportion of the conductive ply is less than 10%, conductivity of the tire is deficient, resulting in decrease in discharge properties of static electricity. Where the proportion exceeds 50%, the amount of the conductive rubber used is increased, affecting the improvement of rolling resistance.

By this, the rim strip rubber 63, the topping rubber of the conductive ply 65X of the first ply 65 and the wing rubber 64 are formed into a continuous conductive path.

The tire 50 uses only the conductive path as a conducting path, and static electricity charged in vehicles can be discharged to road surface from the upper edge of the wing rubber 64 exposed to the surface of the shoulder 17 and contacting with the road surface through the rim strip rubber 63 and the topping rubber of the conductive ply 65X of the first ply 65 from the rim.

A method for applying the conductive ply 65X to the tire is not particularly limited, but a method of jointing a nonconductive ply 65Y and the conductive ply 65X on a molding drum at the time of fabricating a green tire, and forming the first ply 65 is simple and easy. Furthermore, the first ply 65 may be produced by cutting the topping sheet and alternately jointing the conductive ply 65X and the nonconductive ply 65Y in a given width in a jointing process.

The conductive rubber composition can easily be obtained by appropriately adjusting the compounding amount of carbon black, and it is desired that the rubber composition has electric resistivity of preferably less than $10^7$ Ω·cm.

The conductive topping rubber can use the rubber composition for topping rubber described in the first embodiment. Therefore, the description regarding formulation contents such as its rubber component and the amount of carbon black are omitted in the present embodiment.

In the present embodiment, the tire outer face side of the first ply 65 is contacted with the rim strip rubber 63 and the lower edge of the wing rubber 64 to form a conducting path. Therefore, a nonconductive rubber may be used in the tire inner face side of the first ply 65 and the second ply 66.

Even in the present embodiment, the first ply 65 contacting with the inner face side of the right and left rim strips 63 to interconnect the bead parts 51 is used as a conducting path. Therefore, it is sufficient only if the conductive rim strip 59 and wing 64 are provided in at least either one tire side part, and the arrangement is not particularly limited. That is, when the conductive rim strip 59 and wing 64 are provided in every either one tire side part, discharge properties of static electricity using the first ply 65 as a conducting path can be secured.

The conductive and nonconductive rubber rubbers used in the rim strip rubber 63 and the wing rubber 64 can use the rubber compositions described in the first embodiment. Therefore, the description regarding formulation contents such as its rubber component and the amount of carbon black is omitted in the present embodiment.

In the tire 50 shown in FIG. 5, the tread rubber 61 shows a tread of integrated structure. In the case that the tread part 53 has a cap/base structure, a nonconductive rubber is applied to a cap rubber from the standpoints of rolling resistance and wet properties. A base rubber can appropriately be selected from a conductive or nonconductive rubber. Other sites such as a topping rubber of a belt and bead filler can appropriately be selected from a conductive or nonconductive rubber so long as a conducting path is not formed. A nonconductive rubber is preferably selected from the standpoint of the improvement in rolling resistance and wet properties.

In the above embodiment, the invention is described based on the two-ply tire comprising two carcass plies. However, it is as a matter of course that the invention can be applied to the tire having a one-ply structure, in which one carcass ply is turned back from the inside of the tire to the outside thereof around the bead part, reaches the shoulder part 57 through the side wall 56, and is locked.

Fourth Embodiment

A fourth embodiment is such that in a tire 100 using a nonconductive ply 90 in which a nonconductive rubber is used in a topping rubber of both the front and back faces of a carcass ply, on the entire circumference, a conductive path is formed on a part of the nonconductive ply 90 by a conductive rubber.

The conductive path is obtained as follows. For example, a conductive rubber sheet 91 comprising a conductive rubber, having a thickness of from about 0.2 to 1 mm and a width of from about 2 to 10 cm is laid on the surface of the topping rubber of the nonconductive ply 90 so as to contact with a rim strip 93 comprising a conductive rubber and a wing 94 exposed to a ground contact edge region in a material preparation process of a carcass and a green tire fabricating process. The method is not particularly limited. Furthermore, the conductive rubber sheet 91 may be arranged over both sides between a bead part and a bead part, and may be arranged in only one side part.

By this, similarly to the embodiments 1 to 3 above, a conducting path comprising the conductive rubber sheet 91 is formed in the tire 100, and static electricity can be discharged.

FIG. 7 is a tire side schematic view of a tire 100 from which a side wall rubber was removed, showing the embodiment that a conductive path is formed in the nonconductive ply 90. A tire 100a of FIG. 7 (a) shows the case that plural (8 in the Figure) conductive paths are radially formed, a tire 100b of (b) shows the case that plural (4) conductive paths are spirally formed, and a tire 100c of (c) shows the case that a conductive path is helically formed.

EXAMPLES

The present invention is specifically described based on the Examples, but the invention is not construed as being limited thereto.

A conductive rubber and a nonconductive rubber, in which the compounding amount of carbon black was adjusted, regarding rubber compositions for topping of a carcass ply, for rim strip and for wing shown in Table 1, and nonconductive rubber compositions for a side wall of carbon black compounding and for a tread by silica compounding shown in Table 2 were kneaded and prepared according to the formulations (parts by weight) shown in the Tables by the ordinary method using a Banbury mixer having a volume of 200 liters. Rubber components and compounding agents used are as follows. Vol % of carbon black is a calculated value from the compounding amount (parts by weight).

Natural rubber (NR): RSS #3, made in Thailand

Butadiene rubber (BR): BR150B, Ube Industries, Ltd.

Styrene-butadiene rubber (SBR): 1502, JSR Corporation

Carbon black FEF for ply topping rubber: SEAST SO, Tokai Carbon Co., Ltd.

Carbon black HAF for rim strip rubber: SEAST 3, Tokai Carbon Co., Ltd.

Carbon black FEF for wing rubber: SEAST SO, Tokai Carbon Co., Ltd.

Carbon black ISAF for tread rubber: SEAST 6, Tokai Carbon Co., Ltd.

Carbon black FEF for side wall rubber: SEAST SO, Tokai Carbon Co., Ltd.

Silica: NIPSIL AQ, Tosoh Silica Corporation

Silane coupling agent: Si69, Degussa

Aroma oil: X-140, Japan Energy Corporation

Paraffin wax: OZOACE-0355, Nippon Seiro Co., Ltd.

Age resistor 6C: NOCRAC 6C, Ouchi Shinko Chemical Industrial Co., Ltd.

Stearic acid: RUNAX S-20, Kao Corporation

Zinc oxide: ZINC WHITE #1, Mitsui Mining & Smelting Co., Ltd.

Sulfur: 5% oil-treated powdery sulfur, Hosoi Chemical Industry Co., Ltd.

Vulcanization accelerator NS: NOCCELER NS-P, Ouchi Shinko Chemical Industry Co., Ltd.

Electric resistivity of each rubber composition was measured according to JIS K6911, and is shown in Tables 1 and 2. The measurement conditions were voltage applied: 1,000V, temperature: 25° C., and humidity: 50%.

TABLE 1

| | | Ply topping | | Rim strip | | Wing rubber | |
| --- | --- | --- | --- | --- | --- | --- | --- |
| | | Conductive | Non conductive | Conductive | Non conductive | Conductive | Non conductive |
| Formulation | NR | 80 | 80 | 70 | 70 | 40 | 40 |
| | BR | 20 | 20 | 30 | 30 | 60 | 60 |
| | Carbon black | 50 | 30 | 70 | 30 | 50 | 30 |
| | Aroma oil | 10 | 10 | 3 | 3 | 10 | 10 |
| | Wax | | | 1 | 1 | 1 | 1 |
| | Age resistor | 1 | 1 | 2 | 2 | 2 | 2 |
| | Stearic acid | 2 | 2 | 2 | 2 | 2 | 2 |
| | Zinc oxide | 3 | 3 | 3 | 3 | 3 | 3 |
| | Sulfur | 2 | 2 | 2 | 2 | 2 | 2 |
| | Vulcanization accelerator | 1.5 | 1.5 | 1.5 | 1.5 | 1.5 | 1.5 |
| | Carbon black (vol %) | 16 | 12 | 20 | 12 | 16 | 12 |
| | Electric resistivity ($\Omega \cdot cm$) | $2 \times 10^7$ | $6 \times 10^{12}$ | $7 \times 10^6$ | $2 \times 10^{12}$ | $2 \times 10^7$ | $7 \times 10^{12}$ |

TABLE 2

| | | Side wall Non conductive | Tread rubber Non conductive |
| --- | --- | --- | --- |
| Formulation | NR | 40 | 50 |
| | BR | 60 | |
| | SBR | | 50 |
| | Carbon black | 30 | 0 |
| | Silica | | 60 |
| | Silane coupling agent | | 4 |
| | Aroma oil | 10 | 20 |
| | Wax | 1 | 3 |
| | Age resistor | 2 | 2 |
| | Stearic acid | 2 | 2 |
| | Zinc oxide | 3 | 3 |
| | Sulfur | 2 | 2 |
| | Vulcanization accelerator | 1.5 | 1.5 |
| | Carbon black (vol %) | 12 | 0 |
| | Electric resistivity ($\Omega \cdot cm$) | $7 \times 10^{12}$ | $3 \times 10^{13}$ |

Radial tires (195/65R15 88S) of one-ply structure as shown in FIG. 1 in which a conductive rubber was used in a carcass having a conductive ply, a rim strip rubber and a wing rubber (indicated by "o" in Table 3) or a nonconductive rubber was used in a carcass composed of only a nonconductive ply, a rim strip and a wing (indicated by "x" in Table 3) were produced according to the combination shown in Table 3, and electric resistance and rolling resistance were measured by the following methods.

In the tires having a conductive ply of Examples 1 to 4 and Comparative Examples 3 to 5, a conductive ply was applied in a proportion of the circumferential length of a tire shown in Table 3. In Comparative Example 6, a conductive rubber sheet (electric conductivity=$2\times10^7$ Ω·cm) with carbon black compounding having a thickness of 0.2 mm and a width of 10 cm was adhered over an area of from a rim strip to a tread, thereby securing conductivity of a tire. Regarding a tread rubber and a side wall rubber, the tread rubber and the side wall rubber shown in Table 2 were commonly used in each tire.

The carcass ply used was a topping sheet obtained by subjecting both sides of an adhesive-treated tire cord fabric made of a polyester cord of 1670 dtex/2 with counts of 22/25 mm to topping processing in a finish thickness of 1.3 mm using a conductive rubber or a nonconductive rubber for ply topping shown in Table 1 by a calender apparatus for tire cord for general production, equipped with Z type calender. The carcass ply having conductivity was obtained by jointing a conductive ply having a given length with a nonconductive ply on a molding drum when fabricating a green tire.

Furthermore, two plies (cross angle: 45°) of a steel cord of 2+2×0.25 structure was commonly used as a belt (count: 18/25 mm), and nylon 66 cord of 940 dtex/2 was commonly used as a cap ply (count: 28/25 mm).

Electric resistance of a tire was measured as follows. The tire 10 was mounted on a standard rim R (15×6JJ) with air pressure of 200 kPa, and the rim with the tire was attached to a FF type domestic car of 1,600 cc displacement. After running the car as trial run at 100 km per hour for 3 hours, the electric resistance was measured based on "Measurement procedures of electric resistance of tire under load" specified in WDK, Blatt 3, Germany. Specifically, as shown in FIG. 10, the tire 10 mounted on the rim was vertically ground-contacted on a copperplate 131 placed on a table plate 130 in an electrically insulated state under a load of 400 kg, and electric resistance between the central portion of the standard rim R and the copper plate 131 was measured using a resistance meter 132 of applied voltage of 1,000 V. At the time of measurement, temperature is 25° C. and humidity is 50%. The results are shown in Table 3.

The rolling resistance was measured as follows. A tire was mounted on a standard rim with air pressure of 200 kPa, and rolling resistance under a load of 400 kg at 60 km per hour was measured using a uniaxial drum tester for measurement of rolling resistance. The result was indicated by an index as the value of Comparative Example 1 being 100. The larger value indicates that rolling resistance is higher and fuel consumption property is poorer. The results obtained are shown in Table 3.

TABLE 3

|  | Position of side | Example 1 | Example 2 | Example 3 | Example 4 | Comparative Example 1 |
|---|---|---|---|---|---|---|
| Carcass ply | — | ○ | ○ | ○ | ○ | x |
| Proportion of conductive ply (%) | — | 50 | 50 | 50 | 25 | — |
| Rim strip | Serial side | ○ | ○ | ○ | ○ | x |
|  | Antiserial side | ○ | x | x | ○ | x |
| Wing rubber | Serial side | ○ | ○ | x | ○ | x |
|  | Antiserial side | ○ | x | ○ | ○ | x |
| Electric resistance ($10^6$ Ω) |  | 1 | 5 | 5 | 7 | 10,000 or more |
| Rolling resistance (Index) |  | 104 | 102 | 102 | 103 | 100 |

|  | Position of side | Comparative Example 2 | Comparative Example 3 | Comparative Example 4 | Comparative Example 5 | Comparative Example 6 |
|---|---|---|---|---|---|---|
| Carcass ply | — | x | ○ | ○ | ○ | x |
| Proportion of conductive ply (%) | — | — | 50 | 50 | 9 | — |
| Rim strip | Serial side | ○ | x | ○ | ○ | ○ |
|  | Antiserial side | ○ | x | ○ | ○ | ○ |
| Wing rubber | Serial side | ○ | x | x | ○ | ○ |
|  | Antiserial side | ○ | x | x | ○ | ○ |
| Other |  |  |  |  |  | *1 |
| Electric resistance ($10^6$ Ω) |  | 10,000 or more | 10,000 or more | 10,000 or more | 8,000 | 2 |
| Rolling resistance (Index) |  | 102 | 102 | 103 | 101 | 110 |

*1: A conductive rubber sheet was adhered to the surface of the side wall at both sides over an area of from a rim strip to a tread.

INDUSTRIAL APPLICABILITY

The pneumatic tire of the present invention can be used in various vehicles such as four-wheel cars such as passenger cars, and additionally two-wheel cars such as motorcycles, three-wheel cars, and five-wheel or more buses, trailers and industrial vehicles.

DESCRIPTION OF REFERENCE NUMERALS AND SIGNS

Figure 1:
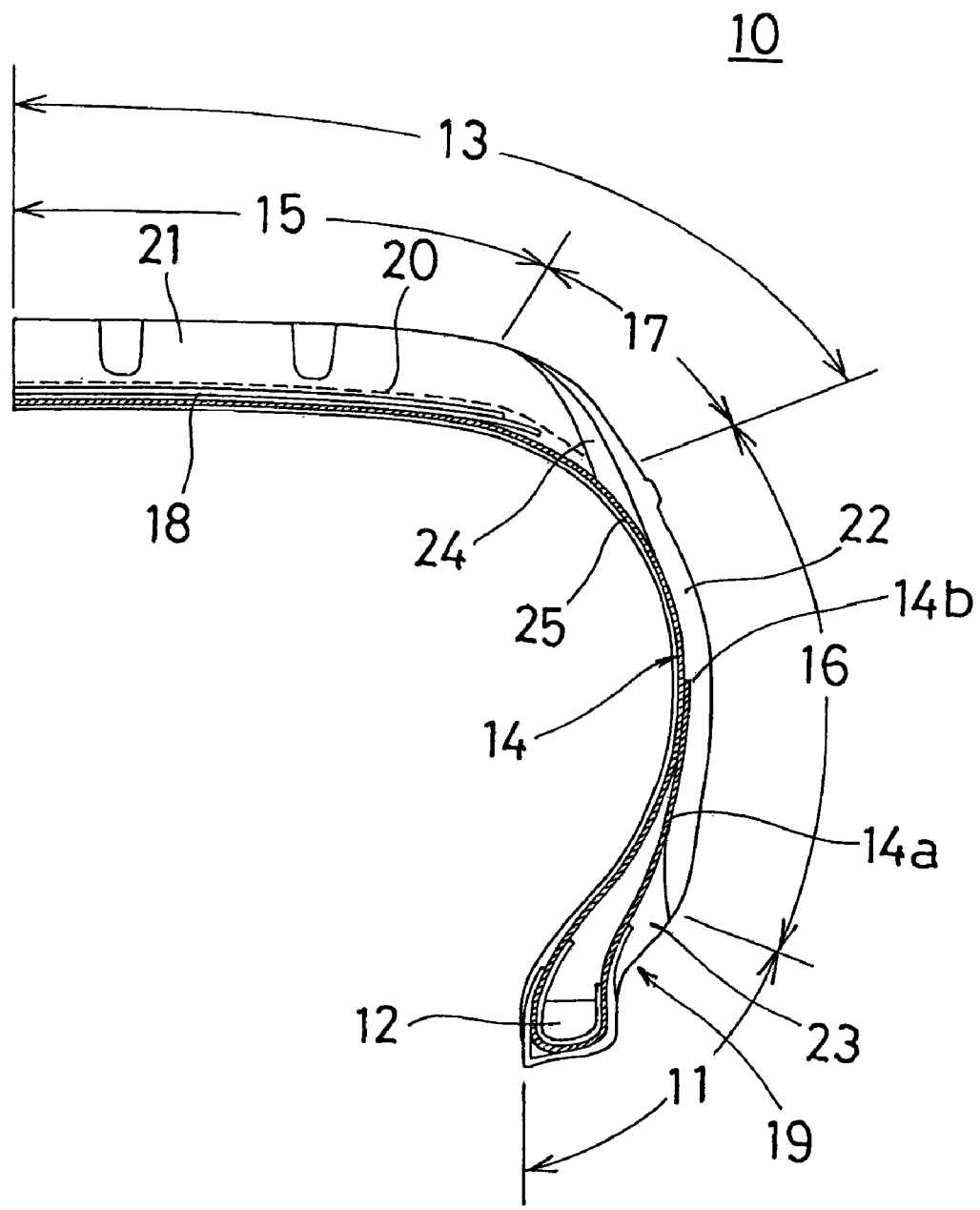
FIG. 1 is a semi-sectional view of a pneumatic tire of a first embodiment.
Figure 2:
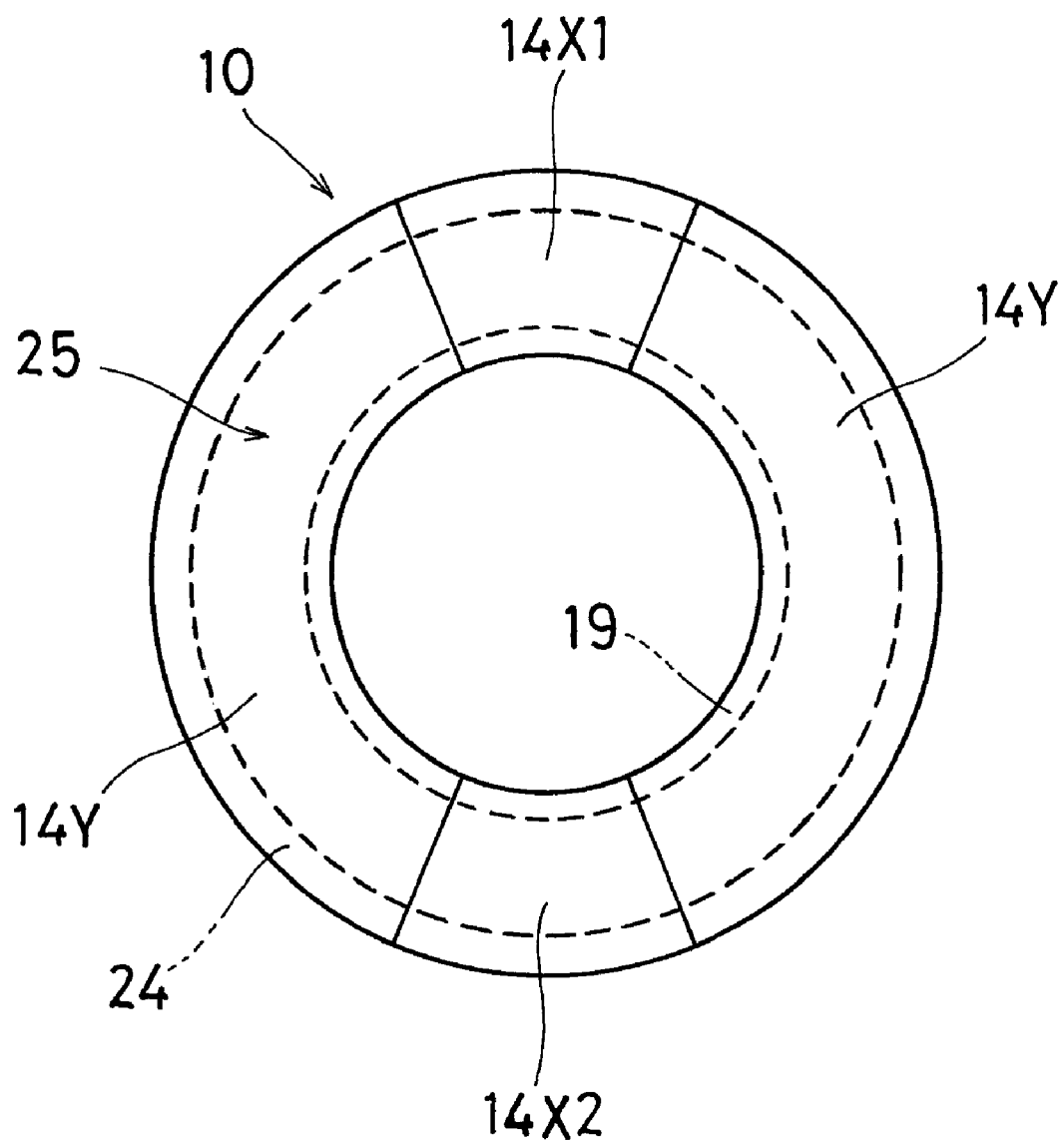
FIG. 2 is a tire side view of a first embodiment in which a side wall rubber was cut off.
Figure 3:
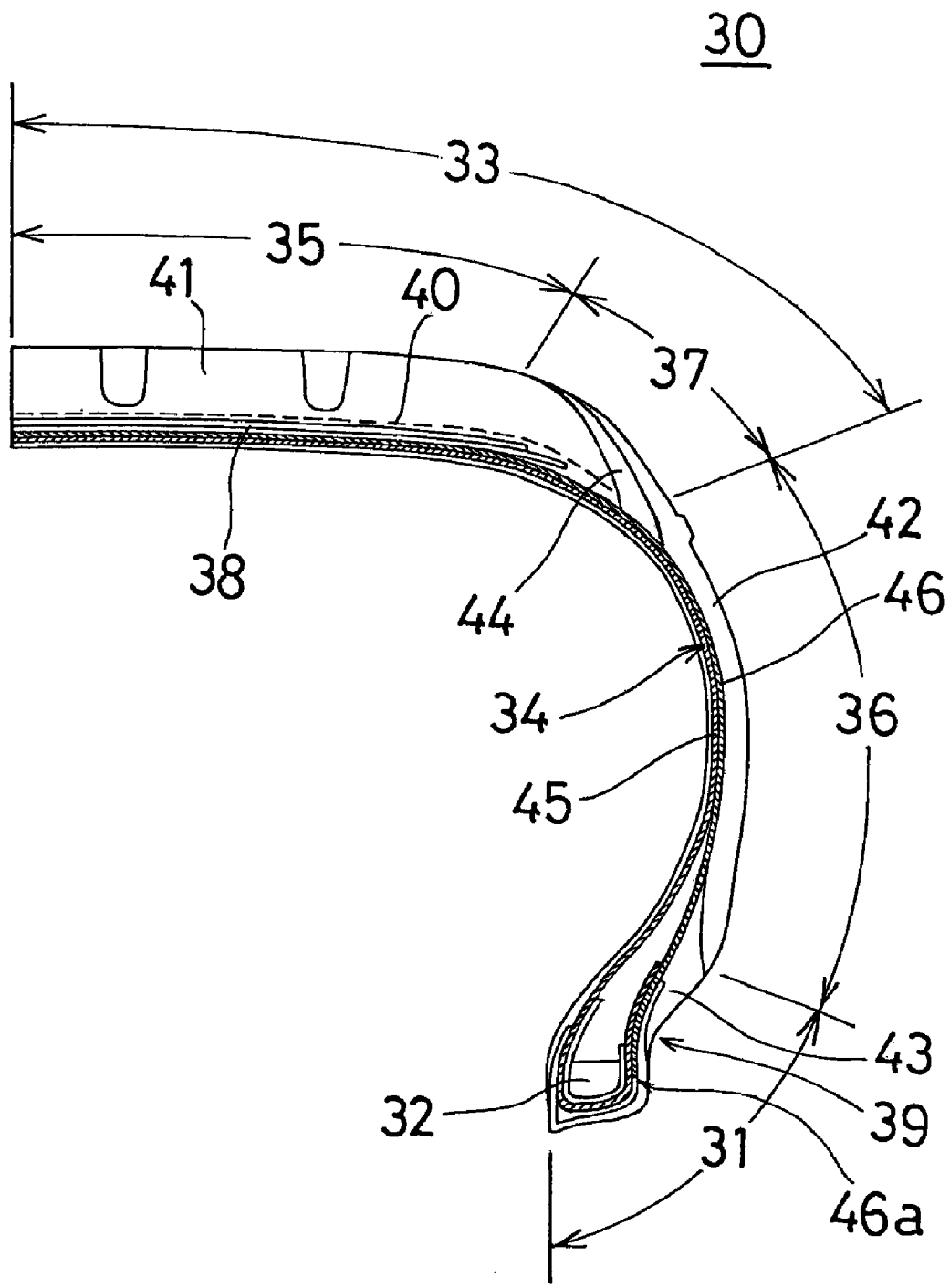
FIG. 3 is a semi-sectional view of a pneumatic tire of a second embodiment.
Figure 4:
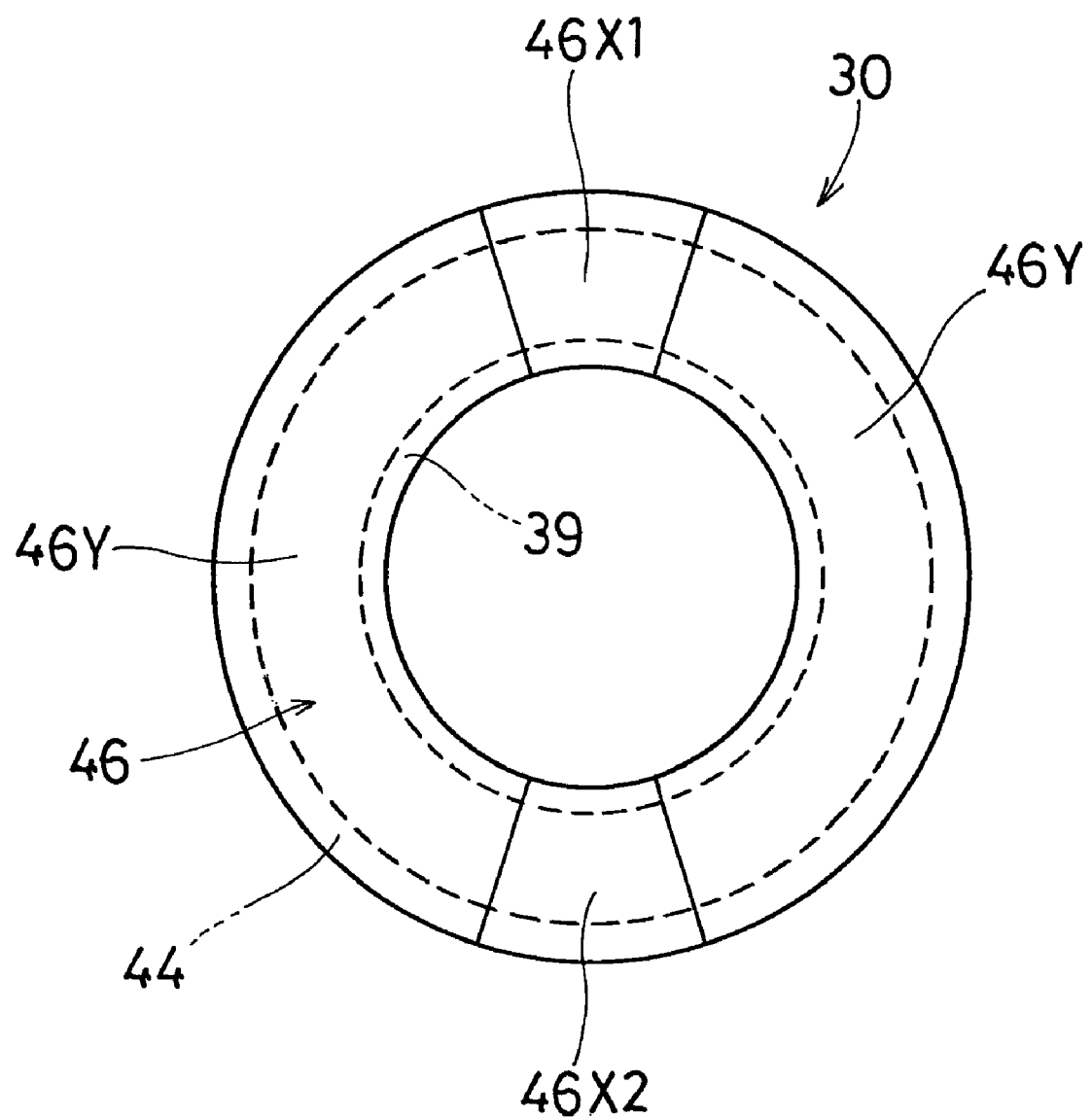
FIG. 4 is a tire side view of a second embodiment in which a side wall rubber was cut off.
Figure 5:
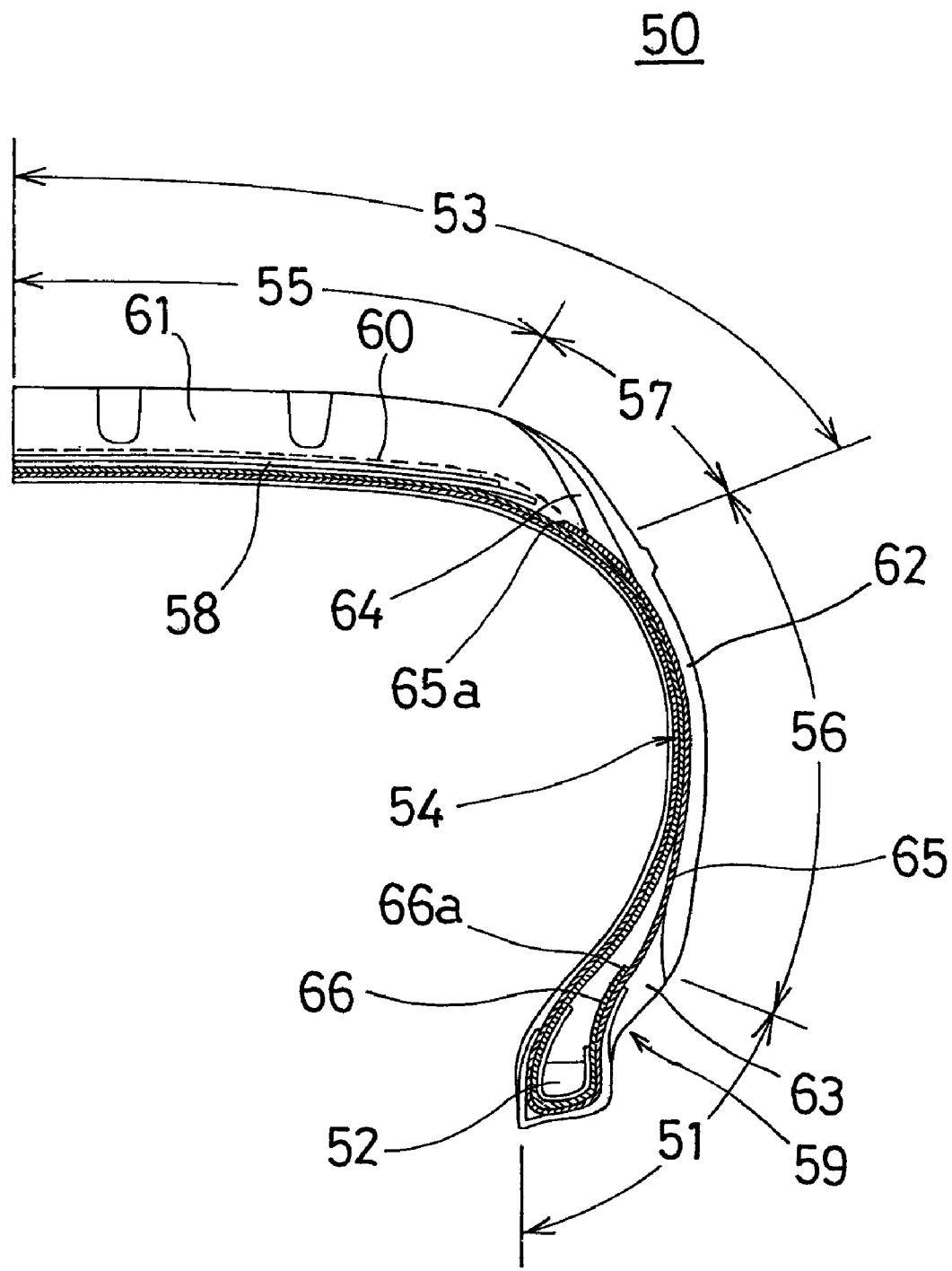
FIG. 5 is a semi-sectional view of a pneumatic tire of a third embodiment.
Figure 6:
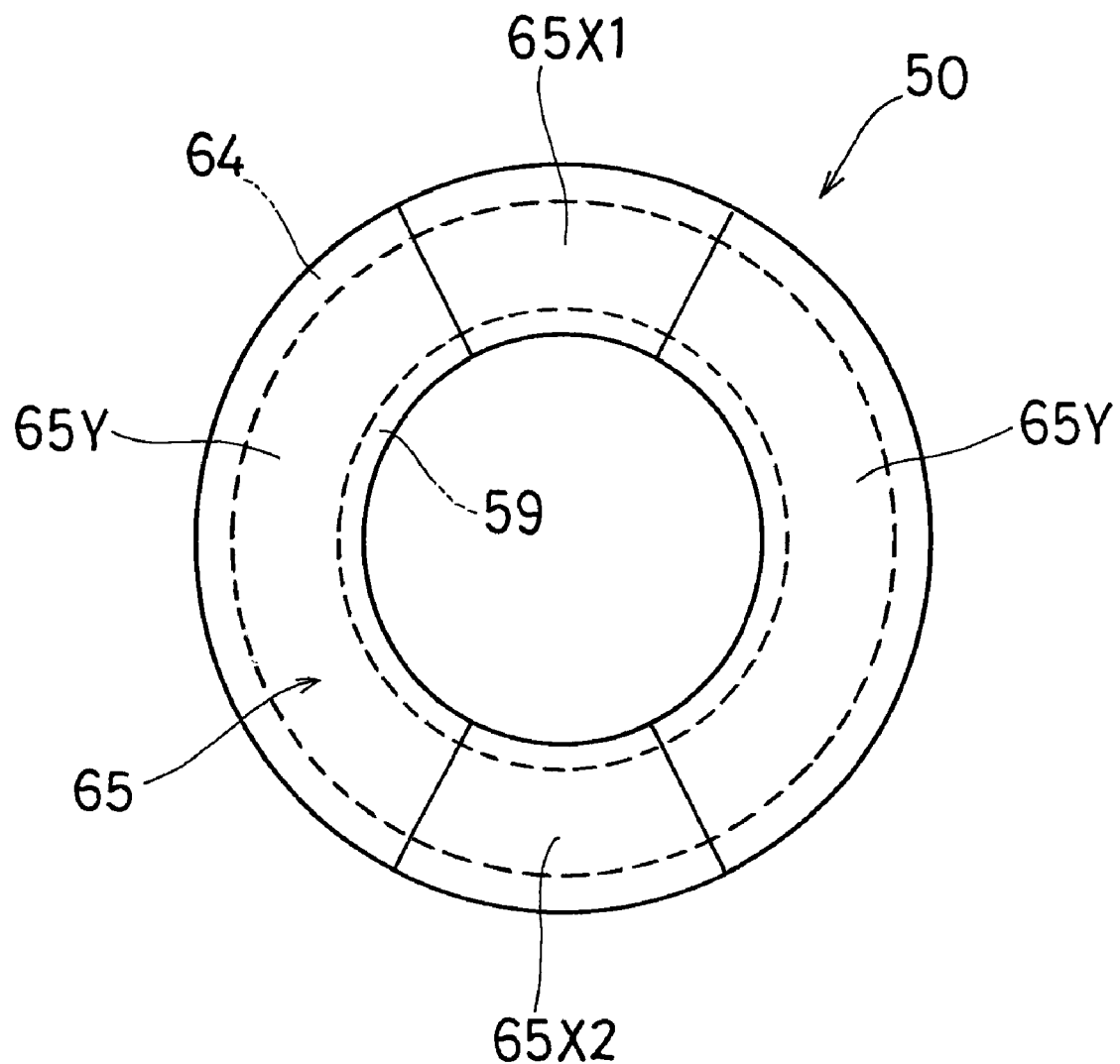
FIG. 6 is a tire side view of a third embodiment in which a side wall rubber was cut off.
Figure 7:
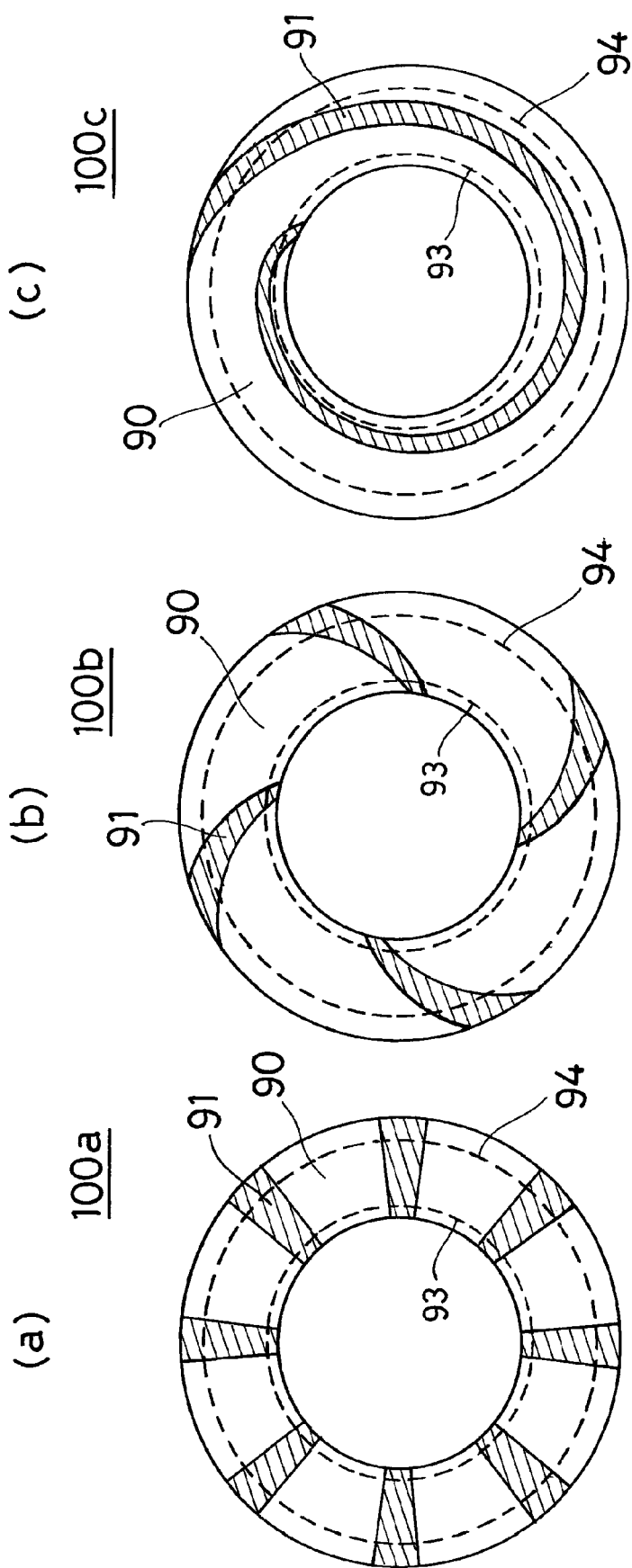
FIG. 7 is a schematic view of a tire side face of a fourth embodiment in which a conductive path was formed.
Figure 8:
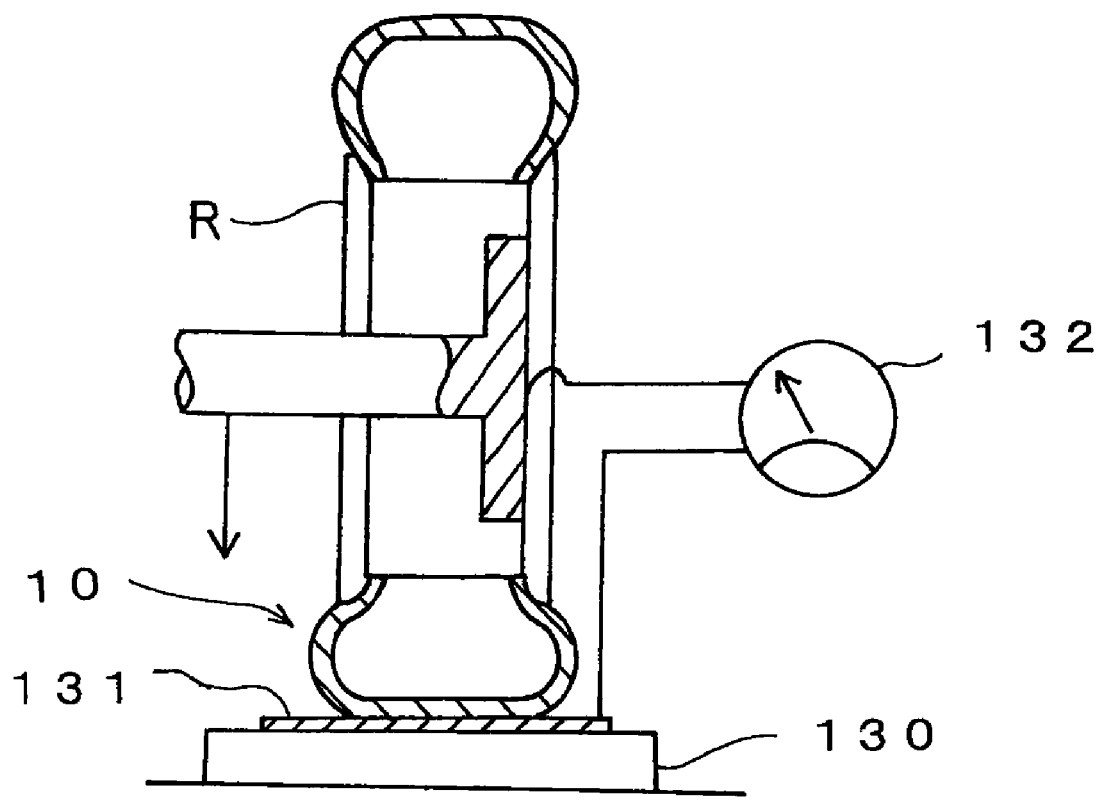
FIG. 8 is a schematic view showing the measurement method of electric resistance of a tire.

10: Pneumatic tire
11: Bead part
12: Bead core
13: Tread part
14: Carcass
14X: Conductive ply
14Y: Nonconductive ply
16: Side wall part
19: Rim strip
24: Wing

What is claimed is:

1. A pneumatic tire comprising a carcass having at least one carcass ply which is locked at a pair of bead parts, a rim strip provided in each of the bead parts and contacting with a rim and the at least one carcass ply, and a wing in which one edge thereof is contacted with the at least one carcass ply and the other edge thereof is exposed to the surface of a ground contact edge region of a tread part;
wherein the at least one carcass ply includes an organic fiber cord covered with a covering rubber, and the at least one carcass ply includes, as at least the covering rubber at the contact face side to the rim strip and the wing, a conductive ply comprising a conductive rubber material and a nonconductive ply comprising a nonconductive rubber material on the circumference of the tire, the conductive ply and the nonconductive ply being a topping rubber attached by topping processing to the surface of a fabric made of the organic fiber cord, and the conductive ply being arranged at one place or two or more places in a circumferential direction of the tire and extending from a part in contact with the rim strip to a part in contact with the wing, and
the conductive ply and the rim strip and the wing in at least one side part form a continuous conductive path comprising a conductive rubber material, only the conductive path is used as a conducting path of the tire, and members other than the conducting path are selected and used from a conductive rubber material or a nonconductive rubber material.

2. The pneumatic tire as claimed in claim 1, wherein the conductive ply occupies from 10 to 50% of the circumferential length of the tire over between the pair of the bead parts.

3. The pneumatic tire as claimed in claim 1, wherein the carcass comprises at least one carcass ply which is turned back from the inside of the tire to the outside thereof around a pair of bead cores and locked, both front and back faces of the carcass ply are covered with the conductive rubber, and the turned back portion of the carcass ply is contacted with the rim strip.

4. The pneumatic tire as claimed in claim 1, wherein the carcass comprises at least one first carcass ply which is turned back from the inside of the tire to the outside thereof around a pair of bead cores and locked, and a second carcass ply which reaches the bead parts through a side wall part from the tread part, contacts with the rim strip, and is locked, and a second carcass ply covering rubber of a tire outside face of the second carcass ply comprises a conductive rubber material.

5. The pneumatic tire as claimed in claim 1, wherein the carcass comprises at least one carcass ply which is turned back from the inside of the tire to the outside thereof around a pair of bead cores and locked, and the carcass ply at the inner face side of the carcass is extended to the wing outward in a radial direction of the tire while contacting with the rim strip to contact with the wing, and is locked, in the turned back portion.

6. The pneumatic tire as claimed in claim 1, wherein the conductive rubber material is a rubber composition having electric resistivity less than $10^8$ Ω·cm.

7. The pneumatic tire as claimed in claim 6, wherein the conductive rubber material comprises a rubber composition comprising a diene rubber as a rubber component, and carbon black having a nitrogen adsorption specific area of from 25 to 100 $m^2/g$ in an amount of 14 vol % or more of the entire rubber composition.

8. The pneumatic tire as claimed in claim 1, wherein the nonconductive rubber material comprises a rubber composition containing a non-carbon black reinforcing agent as a reinforcing agent.

9. The pneumatic tire as claimed in claim 8, wherein the non-carbon black reinforcing agent is silica.

10. The pneumatic tire as claimed in claim 1, wherein at least a portion of the carcass ply that contacts the wing, the sidewall and the rim strip alternates in conductivity from being conductive to being nonconductive to being conductive a plurality of times around the circumference of the tire, in segments that are arranged diametrically from a wing portion to a rim strip portion.

11. The pneumatic tire as claimed in claim 1, wherein the conductive ply extends in a curved manner at an angle to a radial direction of the tire, and the curved conductive ply is arranged at a plurality of places in a circumferential direction of the tire.

12. The pneumatic tire as claimed in claim 1, wherein the conductive ply is helically formed from the part in contact with the rim strip to the part in contact with the wing.

13. The pneumatic tire as claimed in claim 1, wherein the rim strip and the wing in one side part are made of a conductive rubber material, and the rim strip and the wing in the other side part are made of a nonconductive rubber material.

14. The pneumatic tire as claimed in claim 1, wherein in one side part, the rim strip is made of a conductive rubber material and the wing is made of a nonconductive rubber material, while in the other side part, the rim strip is made of a nonconductive rubber material and the wing is made of a conductive rubber material.

15. A pneumatic tire comprising a carcass having at least one carcass ply which is locked at a pair of bead parts, a rim strip provided in each of the bead parts and contacting with a rim and the at least one carcass ply, and a wing in which one edge thereof is contacted with the at least one carcass ply and the other edge thereof is exposed to the surface of a ground contact edge region of a tread part;
wherein the at least one carcass ply includes an organic fiber cord covered with a covering rubber, and the at least one carcass ply includes, as at least the covering rubber at the contact face side to the rim strip and the wing, a conductive ply comprising a conductive rubber material and a nonconductive ply comprising a nonconductive rubber material on the circumference of the tire, the conductive ply being arranged at one place or two or more places in a circumferential direction of the tire and extending from a part in contact with the rim strip to a part in contact with the wing,
the carcass comprises at least one first carcass ply which is turned back from the inside of the tire to the outside thereof around a bead core embedded in each of a pair of the bead parts and is locked, and a second carcass ply which reaches the bead parts through a side wall part from the tread part, contacts with the rim strip and is locked without being turned back around the bead core, the second carcass ply includes, as the covering rubber of the tire outer face side thereof, the conductive ply which contacts with the rim strip and the wing, the conductive ply is not provided in the first carcass ply and the tire inner face side of the second carcass ply, and the conductive ply and the rim strip and the wing in at least one side part form a continuous conductive path comprising a conductive rubber material, only the conductive path is used as a conducting path of the tire, and members other than the conducting path are selected and used from a conductive rubber material or a nonconductive rubber material.

16. The pneumatic tire as claimed in claim 15, wherein the rim strip and the wing in one side part are made of a conductive rubber material, and the rim strip and the wing in the other side part are made of a nonconductive rubber material.

17. The pneumatic tire as claimed in claim 15, wherein in one side part, the rim strip is made of a conductive rubber material and the wing is made of a nonconductive rubber material, while in the other side part, the rim strip is made of a nonconductive rubber material and the wing is made of a conductive rubber material.

18. A pneumatic tire comprising a carcass having at least one carcass ply which is locked at a pair of bead parts, a rim strip provided in each of the bead parts and contacting with a rim and the at least one carcass ply, and a wing in which one edge thereof is contacted with the at least one carcass ply and the other edge thereof is exposed to the surface of a ground contact edge region of a tread part;

wherein the at least one carcass ply includes an organic fiber cord covered with a covering rubber, and the at least one carcass ply includes, as at least the covering rubber at the contact face side to the rim strip and the wing, a conductive ply comprising a conductive rubber material and a nonconductive ply comprising a nonconductive rubber material on the circumference of the tire, the conductive ply being arranged at one place or two or more places in a circumferential direction of the tire and extending from a part in contact with the rim strip to a part in contact with the wing, the carcass comprises at least one carcass ply which is turned back from the inside of the tire to the outside thereof around a bead core embedded in each of a pair of the bead parts and is locked, and the carcass ply at the inner face side of the carcass is extended, in the turned back portion, to the wing outward in a radial direction of the tire while contacting with the rim strip to contact with the wing, and is locked, the carcass ply includes, as the covering rubber of the tire outer face side of the turned back portion, the conductive ply which contacts with the rim strip and the wing, the conductive ply is not provided in the tire inner face side of the turned back portion, and the conductive ply and the rim strip and the wing in at least one side part form a continuous conductive path comprising a conductive rubber material, only the conductive path is used as a conducting path of the tire, and members other than the conducting path are selected and used from a conductive rubber material or a nonconductive rubber material.

19. The pneumatic tire as claimed in claim 18, wherein the carcass comprises two carcass plies of a first carcass ply and a second carcass ply which are turned back from the inside of the tire to the outside thereof around a pair of bead cores and locked, the first carcass ply at the inner face side of the carcass is extended, in the turned back portion, to the wing outward in a radial direction of the tire while contacting with the rim strip to contact with the wing, and is locked, the first carcass ply includes, as the covering rubber of the tire outer face side of the turned back portion, the conductive ply which contacts with the rim strip and the wing, and the conductive ply is not provided in the second carcass ply and the tire inner face side of the turned back portion of the first carcass ply.

20. The pneumatic tire as claimed in claim 18, wherein the rim strip and the wing in one side part are made of a conductive rubber material, and the rim strip and the wing in the other side part are made of a nonconductive rubber material.

21. The pneumatic tire as claimed in claim 18, wherein in one side part, the rim strip is made of a conductive rubber material and the wing is made of a nonconductive rubber material, while in the other side part, the rim strip is made of a nonconductive rubber material and the wing is made of a conductive rubber material.

* * * * *

UNITED STATES PATENT AND TRADEMARK OFFICE
CERTIFICATE OF CORRECTION

| | |
|---|---|
| PATENT NO. | : 8,353,324 B2 |
| APPLICATION NO. | : 12/444405 |
| DATED | : January 15, 2013 |
| INVENTOR(S) | : Norihiko Nakamura |

It is certified that error appears in the above-identified patent and that said Letters Patent is hereby corrected as shown below:

Title page, column 1, Item: 73 (Assignee), line 1, delete "Toyo Tire Rubber Co., Ltd.," and insert --Toyo Tire & Rubber Co., Ltd.,--

Signed and Sealed this
Ninth Day of April, 2013

Teresa Stanek Rea
*Acting Director of the United States Patent and Trademark Office*